US009736989B2

(12) United States Patent
Verhaeghe et al.

(10) Patent No.: US 9,736,989 B2
(45) Date of Patent: Aug. 22, 2017

(54) KNOTTER SYSTEM HAVING AN IMPROVED TWINE RECEIVER

(71) Applicant: CNH Industrial America LLC, New Holland, PA (US)

(72) Inventors: Didier Verhaeghe, Ypres (BE); Kenny Maelfeyt, Vlissegem (BE); Marnix J. Schoonheere, Ichtegem (BE); Yannic Vande Ryse, Bruges (BE); Laurens Nortier, Oostburg (NL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/909,030

(22) PCT Filed: Jul. 16, 2014

(86) PCT No.: PCT/EP2014/065219
§ 371 (c)(1),
(2) Date: Jan. 29, 2016

(87) PCT Pub. No.: WO2015/014616
PCT Pub. Date: Feb. 5, 2015

(65) Prior Publication Data
US 2016/0212943 A1     Jul. 28, 2016

(30) Foreign Application Priority Data
Jul. 31, 2013 (BE) .................................. 2013/0514

(51) Int. Cl.
*A01F 15/14* (2006.01)
*B65B 13/26* (2006.01)
*A01F 15/08* (2006.01)

(52) U.S. Cl.
CPC ........ *A01F 15/145* (2013.01); *A01F 15/0858* (2013.01); *A01F 15/14* (2013.01); *B65B 13/26* (2013.01)

(58) Field of Classification Search
CPC ........ A01F 15/07; A01F 15/14; A01F 15/145; A01F 15/0858; B65H 2701/31; B65H 69/04; B65B 13/26
See application file for complete search history.

(56) References Cited

U.S. PATENT DOCUMENTS 2,670,978 A     3/1954  Rudeen
2,723,871 A *  11/1955  Rudeen ................. A01F 15/145
                                                        289/10

(Continued)

FOREIGN PATENT DOCUMENTS

DE     2361789 A1    6/1975

*Primary Examiner* — Ismael Izaguirre
(74) *Attorney, Agent, or Firm* — Patrick M. Sheldrake

(57) ABSTRACT

A knotter system has a billhook; a twine receiver; a twine delivering system for delivering twines across the billhook to the twine receiver; a swing arm having a lower end portion with a knife blade, moveable below the billhook, a first drive to make the billhook perform at least a first and a second full rotation to move the swing arm two times from a backward to a forward position and back to form respectively a first and second consecutive knot; wherein the twine receiver comprises a rotatable twine disc and a twine holder adapted to clamp twines against the twine disc; wherein said twine disc is provided with at least a first and a second notch for receiving the twines, and a protruding ridge located after the second notch, such that the twine holder is pushed by the ridge during and/or after the formation of the second knot.

15 Claims, 12 Drawing Sheets

(56) References Cited

U.S. PATENT DOCUMENTS

| | | | | |
|---|---|---|---|---|
| 3,570,354 A | * | 3/1971 | Grillot | A01F 15/145 |
| | | | | 289/14 |
| 7,296,828 B2 | | 11/2007 | Schoonheere et al. | |
| 2006/0012176 A1 | * | 1/2006 | Schoonheere | A01F 15/145 |
| | | | | 289/2 |
| 2006/0108806 A1 | * | 5/2006 | Naeyaert | A01F 15/145 |
| | | | | 289/2 |
| 2007/0180967 A1 | * | 8/2007 | Wright | A01F 15/145 |
| | | | | 83/651 |

* cited by examiner

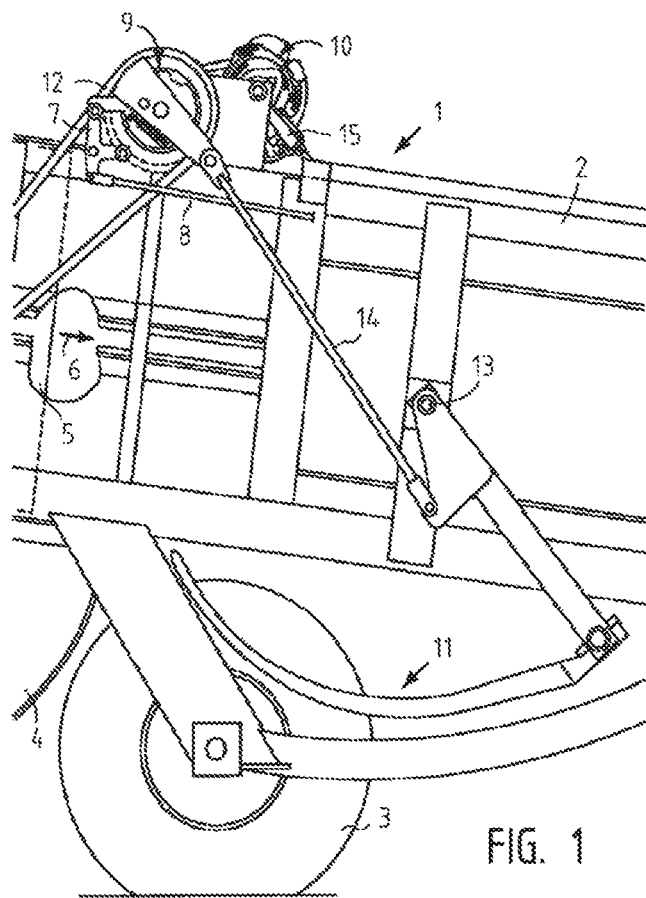
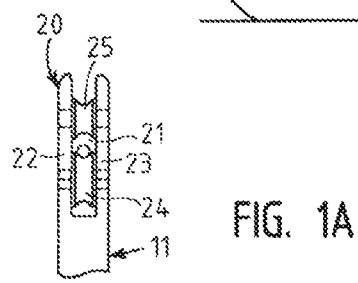
FIG. 1
FIG. 1A

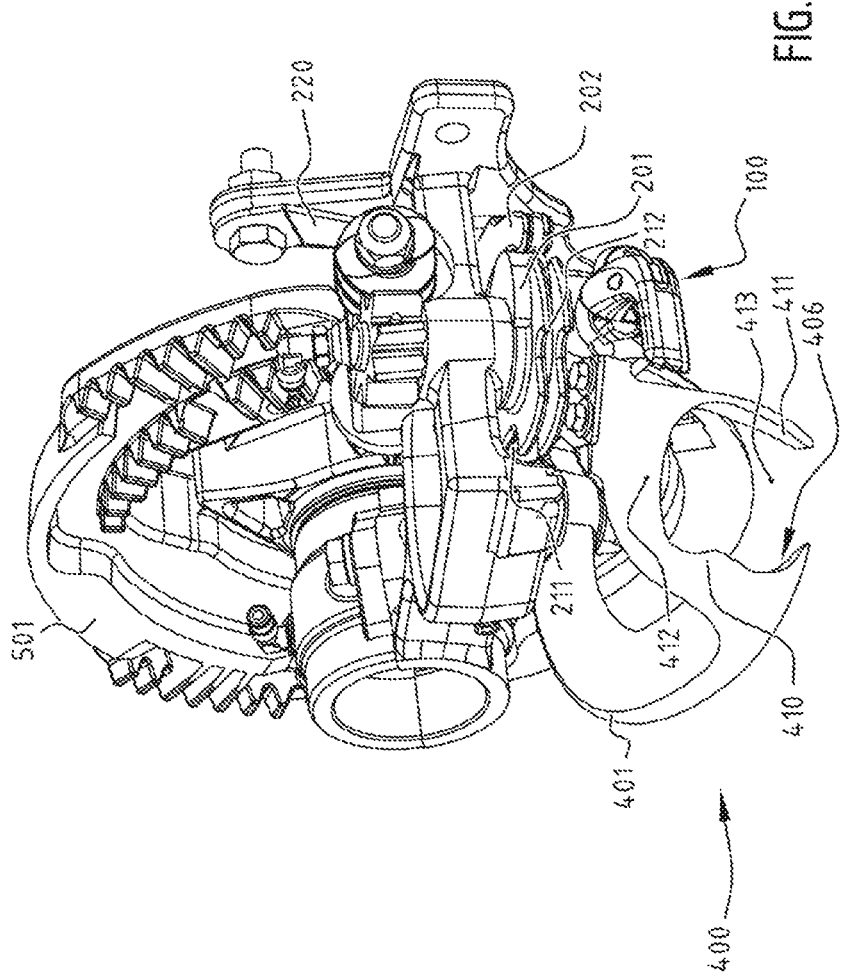

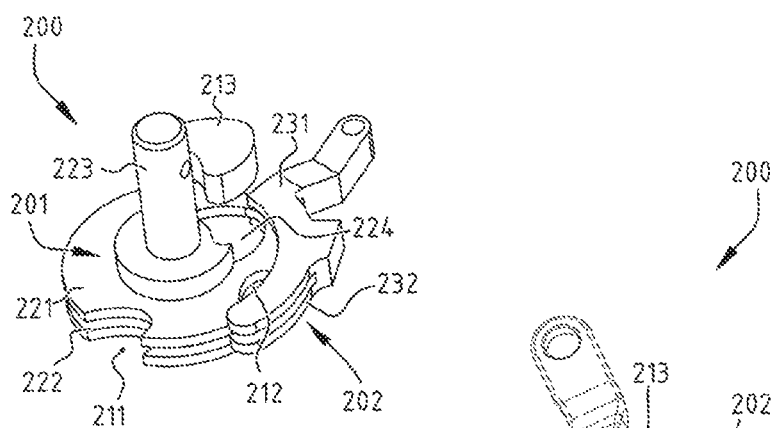
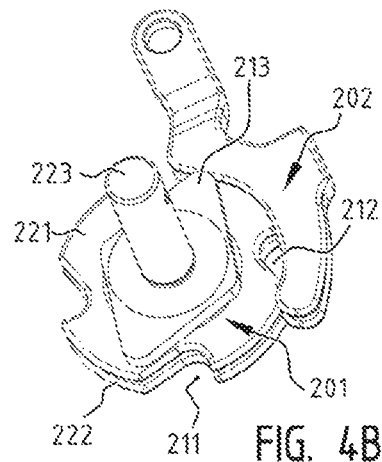
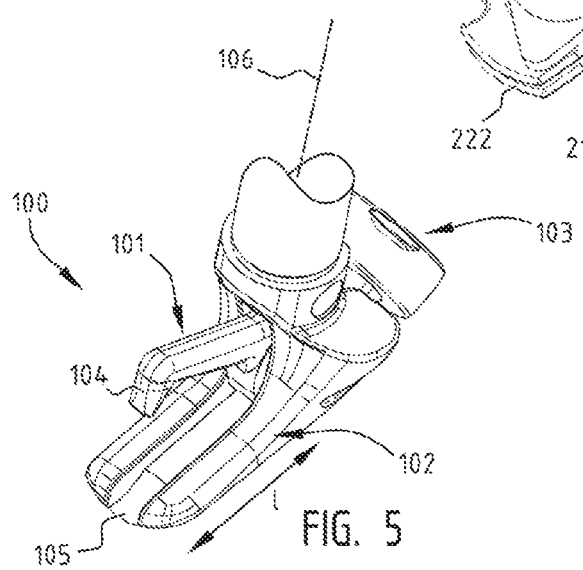

KNOTTER SYSTEM HAVING AN IMPROVED TWINE RECEIVER

This application is the US National Stage filing of International Application Serial No. PCT/EP2014/065219 filed on Jul. 16, 2014 which claims priority to Belgium Application BE2013/0514 filed Jul. 31, 2013, each of which is incorporated herein by reference in its entirety.

FIELD OF THE INVENTION

The present invention relates to a knotter system, in particular to a knotter system for a baler for forming two consecutive knots during a single operation cycle, to a baler comprising such a knotter system, and to a method for making two consecutive knots.

BACKGROUND OF THE INVENTION

Rectangular bales are able to maintain their shape by means of a series of parallel extending twine loops, provided lengthwise around the bales. Balers typically use automatic knotters by which two knots are made on every loop for binding a bale. An example of a knotter system for a baler is disclosed in US 2006/00121501, in BE 2012/0697 and in BE 2012/0698 in the name of the Applicant, the disclosures of which are included herein by reference. The knotter system disclosed in US 2006/00121501 has the advantage that two consecutive knots can be formed during one operation cycle, without the formation of twine tails.

The object of the present invention is to further improve the known knotter systems, and in particular to provide a knotter system allowing for an improved formation of the second knot whilst avoiding twine waste parts.

Further objects of embodiments of the invention are to provide a knotter system allowing to realize a better and easier removal of the second knot from the billhook at the end of an operation cycle, a knotter system allowing an improved guiding of the binding material on the billhook, and a knotter system having a reduced amount of twine slack resulting in a knotter system that can be mounted closer to the bale chamber and that can be built in a more compact way.

SUMMARY OF THE INVENTION

According to an embodiment of the invention, the knotter system comprises a billhook for forming a knot; a twine receiver for holding twines; a twine delivering system for delivering twines across the billhook to the twine receiver; a swing arm having a lower end portion with a knife blade; and a first drive means of the billhook and the swing arm. The swing arm is arranged for moving the lower end portion below the billhook, between a backward position and a forward position. The knife blade is arranged for cutting twines between the billhook and the twine receiver whilst moving from the backward position to the forward position. The first drive means is adapted to make the billhook perform at least a first full rotation and a second full rotation and to move the swing arm at least two times from the backward position to the forward position and back during a full operation cycle to form respectively a first and second consecutive knot. The twine receiver comprises a rotatable twine disc and a twine holder. The twine holder is adapted to clamp twines against the twine disc. The twine disc is provided with at least a first and a second notch for receiving the twines, said twine disc being provided with a protruding ridge located after the second notch, seen in a direction of rotation of the twine disc, such that the twine holder is pushed away by the protruding ridge during and/or after the formation of the second knot.

By providing a protruding ridge after the second notch, the operation will be as follows. After/during the forming of the first knot, the twines are held firmly, so that the knife blade will cut the twines. However, after/during the forming of the second knot the holder is pushed away, allowing the twines to slip, so that the knife blade will not cut the twines. In that way it is avoided that a small twine part is cut off, hence avoiding residual twine waste. The use of a protruding ridge is a particularly robust and simple means to obtain the "twine slipping effect" after forming the second knot.

According to a preferred embodiment the knotter system comprises a second drive means adapted for rotating the twine disc from an initial position to a first position during a first turn whilst clamping twines in the first notch, for forming of the first knot, and for proceeding to rotate the twine disc from the first position to a second position, preferably being the initial position, during a second turn, whilst letting twines in the second notch slip during the forming of the second knot. The second drive means may comprise a knotter disc; a twine disc pinion mounted on an axis of the twine disc; a worm gear drive coupled to the twine disc pinion; and a bevel gear connected to the worm gear drive and in position for sequential meshing engagement with a pair of circumferentially spaced gear sections on the knotter disc.

According to another aspect of the invention the twine disc comprises only two notches spaced apart along the circumference of the twine disc at an angle below 180 degrees, preferably between 30 and 170 degrees, more preferably at an angle of approximately 90 degrees. Providing the twine disc with only two notches spaced along the circumference at an angle smaller than 180 degrees, is advantageous because this will allow the notches to be located at a lower part of the twine discs, having their open end directed towards the bottom, when the knotter is in a non-active state. In that way it is avoided that dirt can accumulate in the notches in the non-operative state of the knotter. The first turn may then be a rotation over approximately the angle between the first and the second notch, and the second turn a rotation over approximately 360 minus said angle. Preferably, said angle is approximately 90 degrees, and the first turn is a rotation over approximately 90 degrees and the second turn a rotation over approximately 270 degrees.

According to a preferred embodiment the twine disc comprises a first disc and a second disc fixed to a rotatable axis, and the twine holder comprises a first press plate intended for being in operative contact with an outer side of the first disc and a second press plate intended for being inserted between inner sides of the first and second disc. The first disc may be provided at its inner and/or outer side with the protruding ridge protruding in radial direction from the axis. According to a possible embodiment the first disc is provided with an opening, and the protruding ridge is formed by a part mounted in the opening and fixed to the second disc. In that way the protruding ridge forms an abutment for both the first and second press plate, so that the twine holder is moved away from the axis of the twine disc in a stable manner. Preferable the first disc and second disc are mounted parallel to each other and have substantially the same shape and dimensions, wherein said first and second notches are formed by recesses at the circumference of the first and second discs.

According to another aspect of the invention there is provided a baler comprising a plurality of knotter systems according to any one of the above disclosed embodiments.

According to yet another aspect, the invention relates to a method for making two consecutive knots. The method comprises: guiding twines to be knotted over a billhook and clamping said twines at a clamping location; making the billhook perform a first full rotation to form a first knot and moving a swing arm with a knife blade from a backward position to a forward position to remove the first knot from the billhook and to cut the twines between the first knot and the clamping location; moving the swing arm back to the backward position, guiding the twines over the billhook, and making the billhook perform a second full rotation to form a second knot. During the forming of the second knot, the twines are clamped against a twine disc by a twine holder. During and/or after the formation of the second knot the twine holder is pushed away by a protruding part on the twine disc releasing the twines. The method further comprises: moving the swing arm from the backward position to the forward position following the formation of the second knot, wherein, due to the pushing away of the twine holder, the twines slide over the knife blade without cutting the twines; and moving the swing arm back to the backward position.

Because of the slipping of the twines following the formation of the second knot, the free ends of the strands are considerably longer than the free ends obtained during the first knot formation. Preferably, upon finalizing the knot, the free ends no longer are pulled completely out of the knot, resulting in a so-called loop-knot.

According to a preferred embodiment, before forming the first knot, the twines are delivered across the billhook in a first notch of the twine disc. The twines are being held in the first notch by the twine holder during the forming of the first knot. Next, the twine disc is rotated so that the twines are received in a second notch of the twine disc following the forming of the first knot; said twines being held in said second notch by the twine holder during the forming of the second knot.

Preferably the twine disc is rotated from an initial position to a first position during a first turn whilst clamping twines in the first notch, for forming of the first knot, and from the first position to a second position, preferably the initial position, during a second turn whilst letting twines in the second notch slip during the forming of the second knot. The first turn may be a rotation over a first angle, preferably approximately 90 degrees, and the second turn may be a rotation over 360 degrees minus the first angle, preferably approximately 270 degrees.

Preferably, the swing arm is maintained in the forward position after the second rotation of the billhook for a predetermined period which is sufficient to allow removal of the second knot from the billhook. Typically, this forward position is a further forward position compared to prior art systems. This is in part due to the fact that the billhook is typically longer than a billhook of prior art systems, see further.

In further developed embodiments of the invention the swing arm may have an arm portion and the lower end portion with the knife blade. The lower end portion may comprise a stripping part shaped for stripping a formed knot from the billhook whilst moving from the backward position to the forward position. The lower end portion may further comprise at least one guidance part for guiding the twines that are being delivered by the twine delivering system and/or for guiding the twines below a formed knot during stripping by the stripping part. Such an embodiment has the advantage that it does not require a separate guidance finger, and hence limits the amount of "free" twine. As a result the knotter system can be built in a more compact way, allowing the knotter system to be mounted closer to the bale case. Preferably the lower end portion comprises a heel portion connected to the arm portion of the swing arm, a front portion and a side portion. An open area is formed between the heel portion and the front portion, said open area being shaped for being accessible by the twine delivering system so that twines can be delivered through said open area on the billhook. Using such a lower end portion has the advantage that there can be created sufficient space for the rotation of the billhook and for the delivery of twines through the open area between the front portion and the heel portion. Preferably, the front portion is provided with a stripping part having an upper surface with a shape that is complementary to a shape of a lower surface of the billhook, in order to ensure a good removal of a knot from the billhook.

According to another aspect of the invention the billhook comprises a lower lip, an upper lip connected around a pivot point with the lower lip, and positioning means adapted to move the lower lip away from the upper lip. The length of the lower lip as measured from the pivot point is preferably larger than 35 mm in order to avoid that the twines can slide off the billhook when being delivered by the twine delivery system. In that way the longer billhook can take over partly the function of the guidance finger in prior art systems. The upper lip may be provided at a free end thereof with a downwardly protruding end part, wherein the lower lip is provided with an end recess for receiving the protruding end part. This allows the upper lip to be placed very close to the lower lip, resulting in an improved stripping behavior and in a tighter knot.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein:

FIG. 1 is a fragmentary, side elevational view of a baler having a double knotter tying mechanism;

FIG. 1A is a detailed view of a needle end portion;

FIGS. 3A-3D are exploded perspective views of an embodiment of the double knotter system of the invention, looking from different angles;

FIG. 4A is a perspective view of a first embodiment of a twine receiver of the invention;

FIG. 4B is a perspective view of a second embodiment of a twine receiver of the invention;

FIG. 5 is a perspective view of an embodiment of a billhook of the invention;

DETAILED DESCRIPTION OF THE PREFERRED EMBODIMENT

Figure 2:
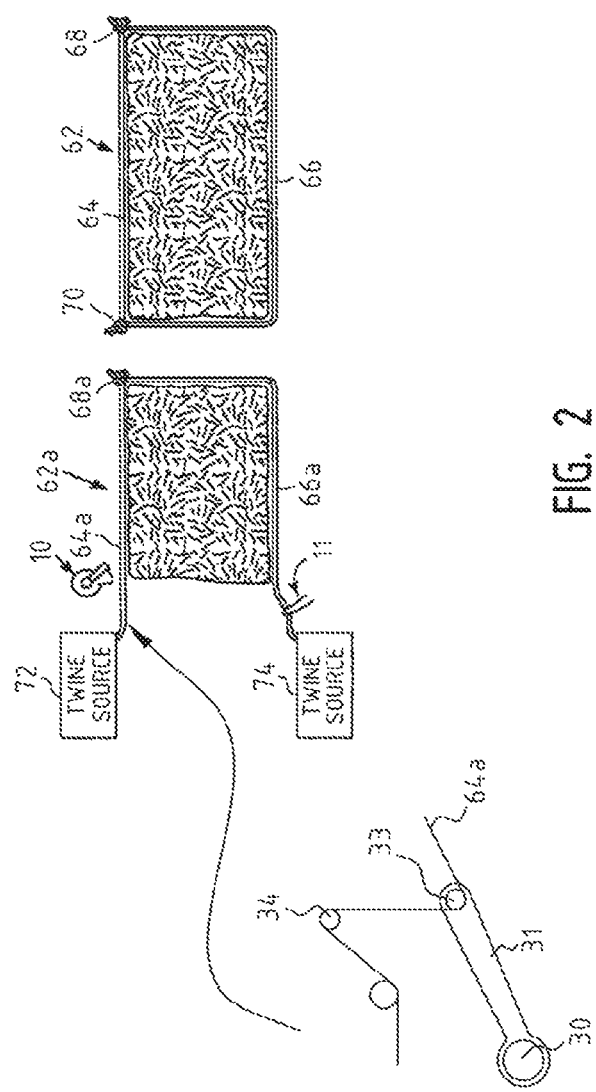
FIG. 2 is a diagrammatic view of a complete and a partial double-knotted loop without the forming of twine tails.

In the description which follows and in certain passages already set forth, the principles of the present invention will be described in terms of "twine" and "knots" formed in such twine. However, it is to be recognized that such principles extend to wire and twisted junctions of wire as well as twine and knots.

Many of the fastening, and connection processes, and other means and components utilized in this invention are widely known and used in the field of the invention described, and their exact nature or type is not necessary for an understanding and use of the invention by a person skilled in the art, and therefore they will not be discussed in significant detail. Also, any reference herein to the terms "left" or "right" are used as a matter of mere convenience, and are determined by standing at the rear of the machine facing in its normal direction of travel.

The baler 1 illustrated in FIG. 1 has a rectangular bale case 2 that is supported by ground wheels 3. The bale case 2 defines a bale chamber wherein material is pushed in through a curved duct 4. A plunger 5 reciprocates within the bale case to intermittently pack fresh charges of material from the duct 4 rearward in the chamber in the direction of the arrow 6. When the bale reaches a predetermined size, a trigger 7 is pulled by a rod 8. This rod 8 engages a dog clutch 9, the clutch 9 in turn being connected to a tying mechanism 10 and a set of needles 11. As will be appreciated, the tying mechanism comprises a set of individual knotters 10 provided crosswise on top of the bale chamber at intervals. Each knotter 10 has an associated needle 11 for assisting in forming an individual loop around a finished bale. When the bale needs tying, the dog clutch 9 connects the knotters 10 and their needles 11 via a drive chain 12 to a source of driving power to initiate the tying operation. As the individual knotters 10 all operate in an identical manner, it suffices to describe the present invention in relation to only one such knotter 10.

The needle 11 is swingably mounted on the bale case 2 by a pivot 13 and is swung back and forth across the bale chamber by a linkage 14, which is activated by the clutch 9. The needle 11 has an "at-home" or rest position fully below the bale case 2 as illustrated in FIG. 1 and a "full-throw" position extending completely across the bale case 2 as illustrated, for example, in FIG. 6C. As illustrated in FIG. 1A, the tip 20 of needle 11 has an eyelet 21 defined therein by the opposed furcations 22 and 23 of the bifurcated tip 20 in conjunction with a pair of longitudinally spaced, transversely extending rollers 24 and 25.

With reference to FIG. 2, to the left of loop 62 is a partial loop 62a which is in the process of being formed. The top strand 64a emanates from a source of twine supply 72, while the bottom strand 66a emanates from an entirely separate, second source of twine supply 74. At the particular point in the sequence chosen for illustration, the knot 68a is in existence, and the bale is approaching that length where the needle 11 is ready to swing into operation and present the strands 64a and 66a to the knotter 10 to start an operation cycle in which two consecutive knots are being formed. In a finished bale, the loop 62 is made from two strands of binding material, i.e., one strand 64 along the top side of the bale and a second strand 66 along the bottom side of the bale and its two opposite, vertical ends. The strands 64 and 66 together form the continuous loop 62. Together, they fully circumscribe the bale. The knot 68 of a bale is typically a so called loop-knot. This means that the ends of the strands 64 and 66 of the knot 68 are released from a retained position so they can be pulled back as will be described further to form a small loop on top of the knot. The knot 68 itself, thus holds the ends of the strands 64 and 66, united with the knot 68.

With this short explanation in mind, the details of the embodiments according to the present invention will now be described. FIGS. 3A-D illustrate a first embodiment of a knotter 10 according to the invention. For convenience the same reference numerals have been used for referring to similar elements in the different embodiments.

The knotter 10 of FIGS. 3A-D comprises a generally circular element, also called knotter disc 501 that is secured to a drive shaft 520 for rotation with the latter through one full revolution when the clutch 9 is engaged. The shaft 502 is typically supported by a forwardly inclined frame 15 (see FIG. 1) attached to the top of the bale case 2, and the frame 15 also supports the knotter components for forming the knots in response to rotation of the knotter disc 501.

The knotter components include a rotary billhook member 100, supported by the frame 15 for rotation about an inclined axis 106 (see FIG. 5); a twine disc 201 rearward of and adjacent to the billhook 100 for holding strands 64a and 66a in position for engagement by the billhook 100 during rotation of the latter; and a swing arm 400 pivotally attached to the frame 15 by a bolt 420. The strands 64a and 66a are held in notches 211, 212 in the rotating twine disc 201 by a retainer or twine holder 202. The tensioning force of this retainer 202 to the twine disc 201 can be adjusted manually by changing the tension of a leaf-spring 220 when a bolt is loosened or tightened.

Figure 3B:
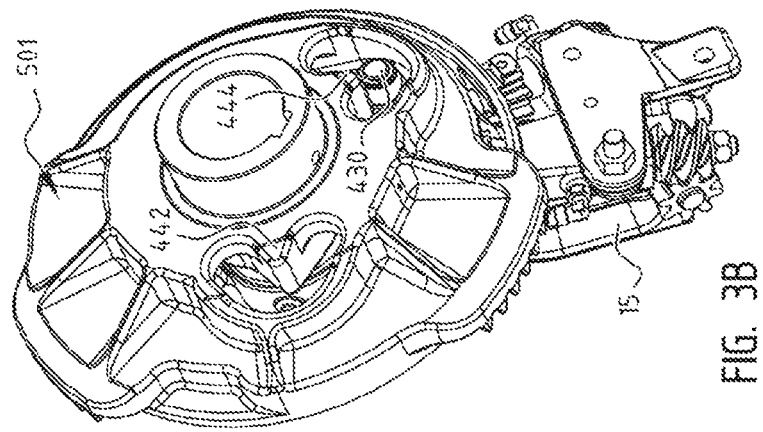
Figure 3A:
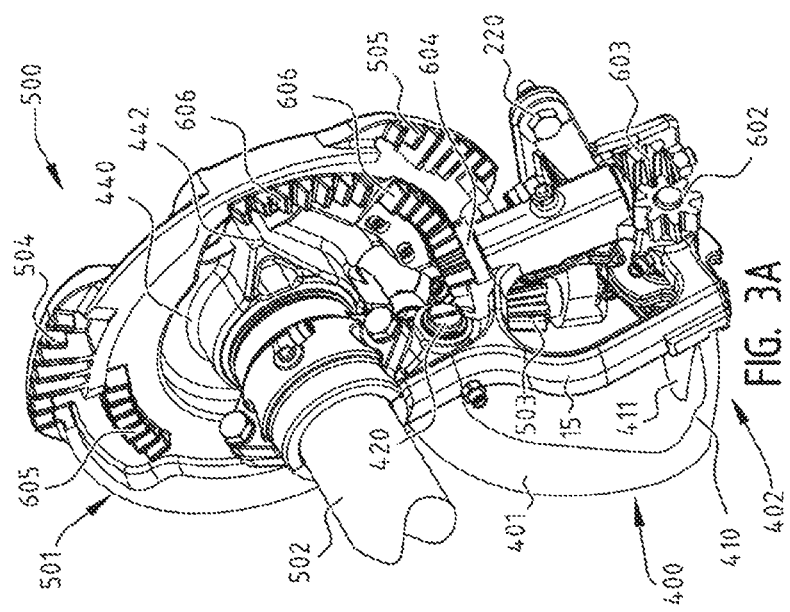
Figure 3C:
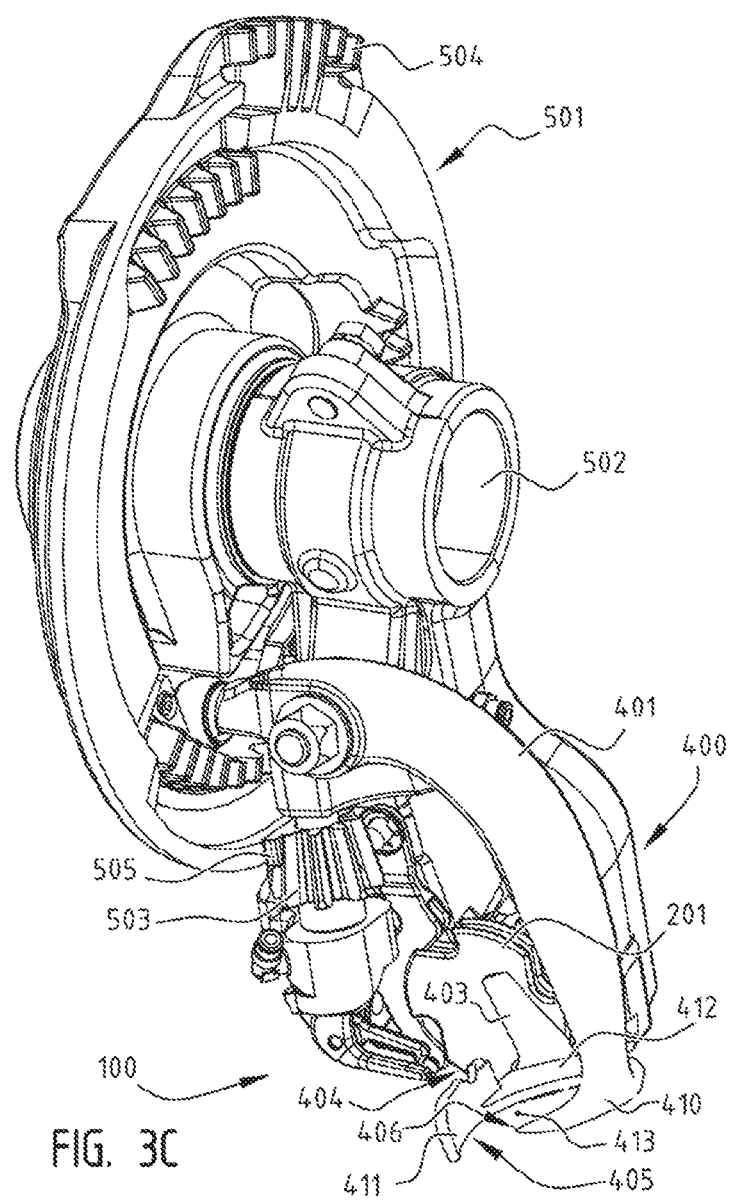

As best illustrated in FIG. 3C, the swing arm 400 has an arm portion 401 and a lower end portion 402 and is arranged for moving the lower end portion 402 below the billhook 100, between a backward position and a forward position. The lower end portion 402 comprises a heel portion 410 connected to the arm portion 401, a front portion 411, and a side portion 412. The side portion 412 extends between the billhook 100 and the twine disc 201 and forms the connection between an end of the heel portion 410 with an opposite end of the front portion 412. The side portion 412 is provided with a knife blade 403 for cutting twines between the billhook and the twine receiver whilst moving from the backward position to the forward position. An open area 413 is formed between the heel portion 410 and the front portion 412. The open area 413 is dimensioned and shaped for being accessible by the twine delivering system (needle 11 and tucker arm, see further) so that twines can be delivered through said open area 413 on the billhook 100. In other words, the lower end portion 402 of the swing arm 400 is shaped in such a way that there is an opening at a side facing away from the twine disc 201, said opening being located underneath the billhook 100 in a knotter position of the swing arm 400.

Figure 6A:
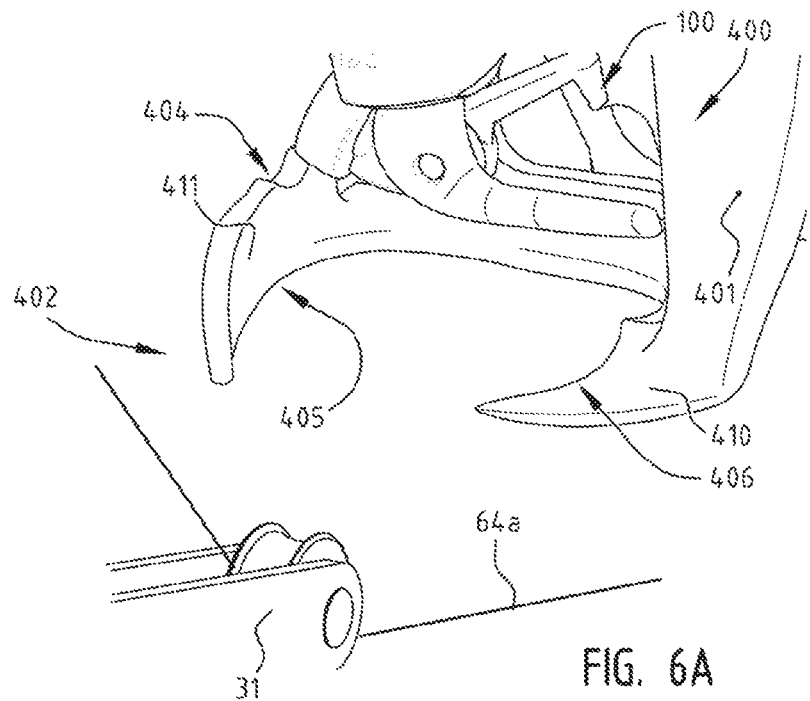
FIGS. 6A to 6L are fragmentary, schematic views illustrating the successive steps of a double-knotting operation.
Figure 6B:
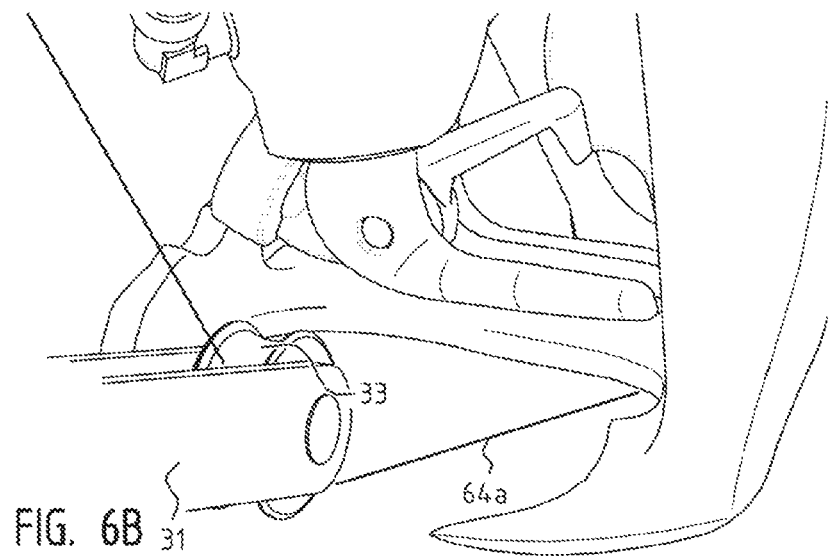

The front portion 411 is provided with a stripping part 404 having an upper surface with a shape that is complementary to a shape of a lower surface of the billhook 100, see also FIGS. 6A and 6B, so that a formed knot can be stripped from the billhook 100 whilst moving the swing arm from the backward position to the forward position. In other words the knife blade 403 will sever the strands 64a and 66a in response to a swinging movement of the arm 400 which also serves to bring the stripping part 404 in engagement with a knot formed on the billhook 100 for stripping such knot off of the billhook 100. Further, the front portion 411 has a curved guidance part 405 oriented in the direction of the heel part 410. The curved guidance part 405 is shaped, dimensioned and arranged for guiding the twines towards the side part 412 during stripping of a formed knot, and more in particular towards the inner angle formed by the front part 411 and the side part 412.

The heel portion 411 has a curved guidance part 406 oriented in the direction of the front part 410. The curved guidance part 406 is arranged for guiding the twines across the billhook during delivery and during knotting.

The guidance parts 405 and 406 make the presence of an additional guide finger to guide the twines before/during/after knotting, as in prior art solutions, unnecessary, reducing the twine slack and allowing for a more compact knotter 10 that may be mounted closer to the bale case 2.

In order to transmit driving power to the billhook 100, the knotter disc 501 is provided with a pinion 503 which is disposed for meshing engagement with a pair of circumferentially spaced gear stretches 504, 505 on the knotter disc 501. Similarly, driving power is transmitted to the discs of the twine disc 201 through, a twine disc pinion 602, a worm gear drive 603 and a bevel gear 604 in position for sequential meshing engagement with a pair of circumferentially spaced gear sections 605, 606 on the knotter disc 501.

Power to swing the arm 400 about the pivot bolt 420 is obtained through a cam follower 430 at the upper end of the arm 400 beyond the pivot bolt 420 which is disposed within a cam track 440 on the knotter disc 501. A pair of circumferentially spaced cam shoulders 442 and 444 in the track 440 is positioned to sequentially engage the follower 430 to operate the latter.

A shaft 30 extends parallel with the shaft 502 to a point substantially in fore-and-aft alignment with the billhook 100, see FIG. 2. At that location, the shaft 30 fixedly carries a rearward extending tucker arm 31. The tucker arm 31 carries a roller 33 at its rearmost end around which the strand 64a is entrained. A length of the strand 64a is also looped upwardly around a slacker arm 34 disposed above the tucker arm 31. The strand 64a may be further clamped between a pair of opposed plates (not shown) of a tensioning unit.

Figure 6C:
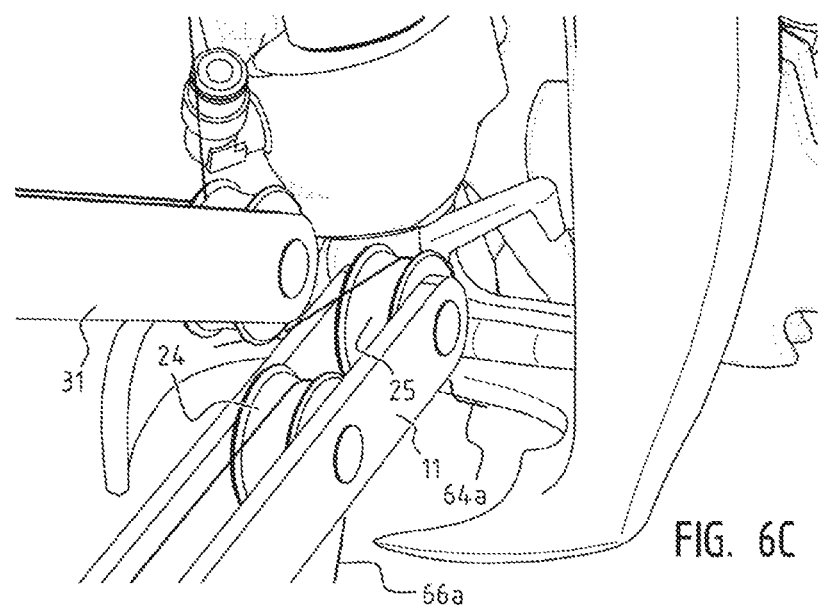

In FIG. 2, the needle 11 is still in its home position. At this point in the bale forming operation, the bale has reached its desired length and it is time to complete the loop around the bale and make the second knot in the loop. It is remarked that at this specific instance, the strand 64a stretches along the top of the bale directly beneath the swing arm 400 but, at least for all effective purposes, is out of contact with the knotter 10. The swing arm 400 moves backward, and the needle 11 swings upwardly toward the knotter 10. It carries with it the strand 66a as the latter is paid out by source 74. Note that because the strand 66a is threaded through the eyelet 21 of needle 11, a length of that strand on the twine source side of the needle 11 is also carried upwardly toward the knotter 10, such extra length being hereinafter denoted 66b. As the needle 11 approaches the knotter 10, the tucker arm 31 is also moved upward, see FIGS. 6A and 6B. The tucker arm 31 rocks upwardly in a counter-clockwise direction to provide the slack necessary in the strand 64a to accommodate the needle movement. The tip of the needle 11, and more particularly, the roller 25, snares the strand 64a as illustrated in FIG. 6C and presents strands 64a and 66a in unison to the knotter 10.

Figure 6D:
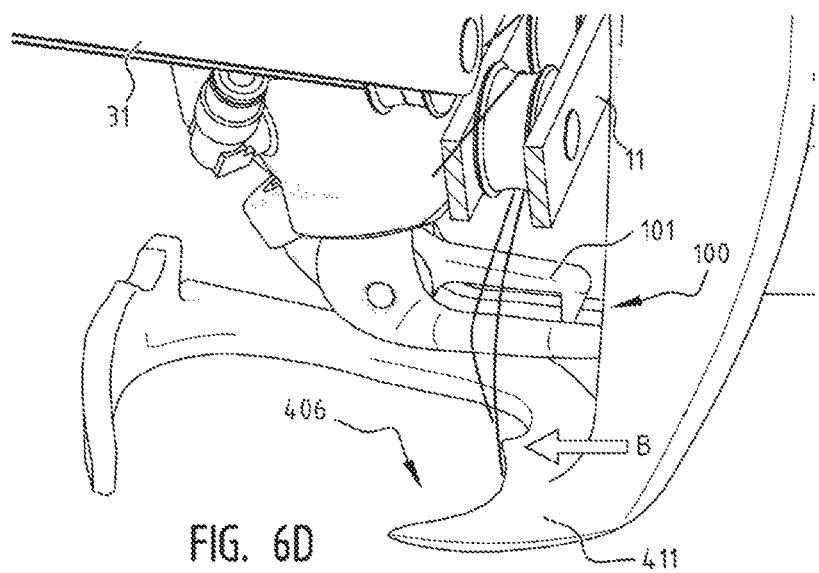

While the strands 64a and 66a are being delivered across the billhook 100 to the twine disc 201, the swing arm 400 is in a position to guide the strands so as to ensure that the strands 64a and 66a are both in proper position across the billhook 100, see FIG. 6D. More in particular the guide part 406 of the heel portion 411 will ensure that the strands 64a, 66a are properly placed across an upper lip 101 of the billhook 100.

Figure 6E:
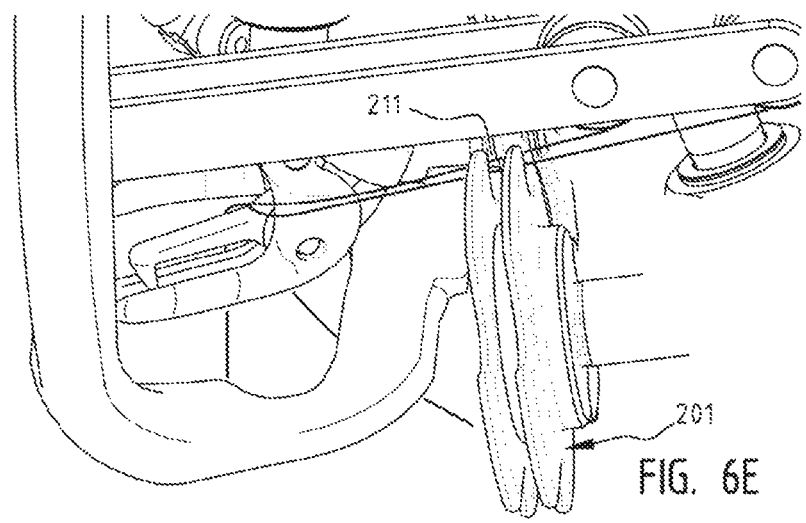

In presenting the strands 64a and 66a, the needle actually drapes the strands across the billhook 100 with the help of the guidance part 406, and thence into awaiting notches 211 of the twine disc 201, whereupon rotation of co-operating discs in the latter, in combination with a pressing twine holder 202, serve to firmly grip the strands and prevent their escape as the billhook 100 begins its rotation, see FIGS. 6D and 6E. At that time the swing arm 400 moves a little backward (arrow B), moving the front portion 410 away from the billhook 100, to provide additional space for the rotation of the billhook.

Figure 6F:
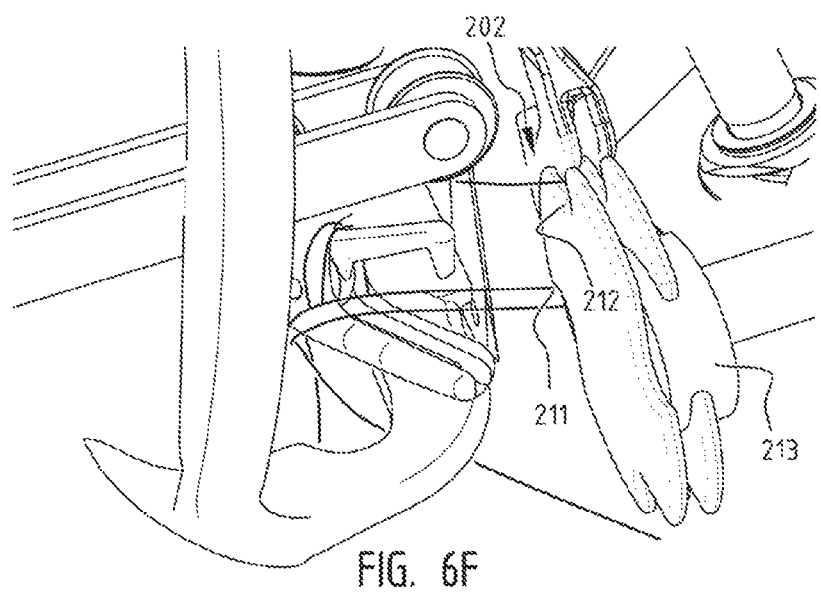
Figure 6G:
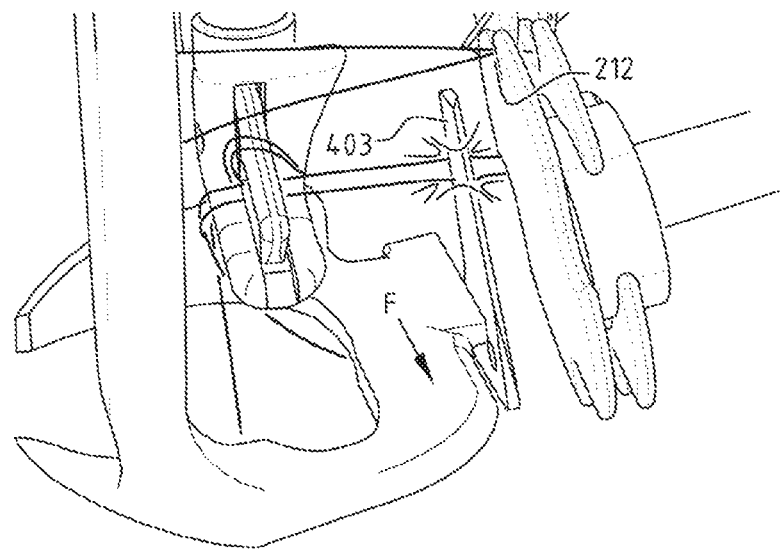

Typically, the twine disc 201 rotates a quarter of a turn and clamps the twines 64a and 66a firmly together in the first notch 211. Now the needle 11 can move downward. During the down travel of the needle 11 the two twines on the back of the needles are placed in the next notch 212 of the twine disc for the second knot, see FIGS. 6E and 6F. While the needle 11 goes down, the billhook 100 continues to rotate to form the first knot. The swing arm 400 swings forward (arrow F in FIG. 6G) to cut the twines under the twine disc with the knife blade 403 and sweeps the knot from the billhook 100 with the help of the stripping part 404.

The billhook 100 is illustrated in detail in FIG. 5 and comprises a lower lip 102, and an upper lip 101 connected around a pivot point with the lower lip 102. When the billhook 100 rotates around its axis 106, a cam follower 103, which is connected to the upper lip 101, engages an element having a cam shoulder (not shown). When rotating, the cam follower 103 will push the upper lip 101 away from the lower lip 102, thus enabling the strands 64a and 66a to enter in between the two lips 101 and 102 while the billhook 100 is rotated. The length l of the lower lip 102 measured from the pivot point is preferably larger than 35 mm, in order to ensure that the strands can be properly placed on the billhook 100 and do not slide off the billhook 100. The upper lip 101 is provided at a free end thereof with a downwardly protruding end part 104, and the lower lip 102 is provided with an end recess 105 for receiving said protruding end part. In that way the upper lip 101 can be placed against or very close to the lower lip 102 ensuring an improved stripping of the knot formed on the billhook 100.

Figure 6H:
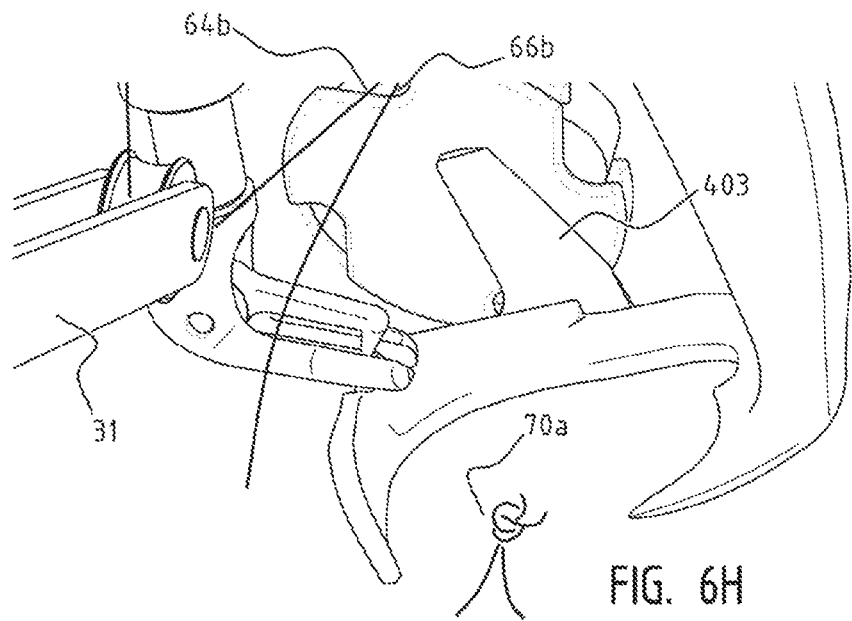

The foregoing described movement on the part of the billhook 100 and the twine disc 201 are brought about by operable inter-engagement of the gear stretch 504 and gear section 605 on the knotter disc 501 with their respective gears 503 and 604 on the billhook 100 and the twine disc 201. Such driving inter-engagement continues until a knot has been formed on the billhook 100, by which time the needle 11 has begun to withdraw. At this point, the cam shoulder 442 of the knotter disc 501 comes into engagement with the roller 430 of the arm 400 so as to swing the bottom of the latter, and hence the knife 403, across that portion of the strands between the billhook 100 and the twine disc 201, thereby severing the same. At the moment of cutting, the strands 64a and 66a extend from in between the lips 101 and 102 towards the twine disc 201, see FIG. 6G. To complete the knot formation, the stripping part 404 engages the strands 64a and 66a which are retained in a twisted manner around the billhook 100. In so doing, the strand parts lying on top of the upper lip 101 are pulled over the strand parts laying in between the upper and lower lips 101 and 102, thereby forming the first knot. As described above, since the free ends of the strands 64a and 66a are very short, they are pulled completely through the knot during its final formation, resulting in the so-called conventional knot 70a. Besides completing the knot, further motion of the arm 400 also strips the finished knot completely from the billhook 100 and drops the completed loop on the bale as illustrated in FIG. 6H.

Figure 6I:
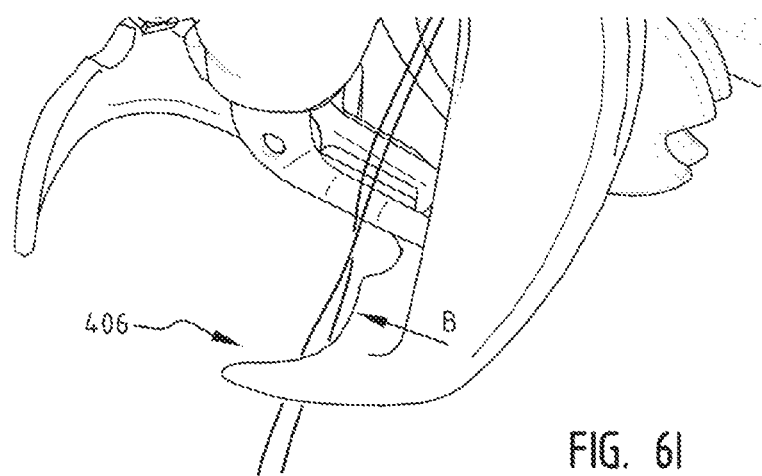
Figure 6J:
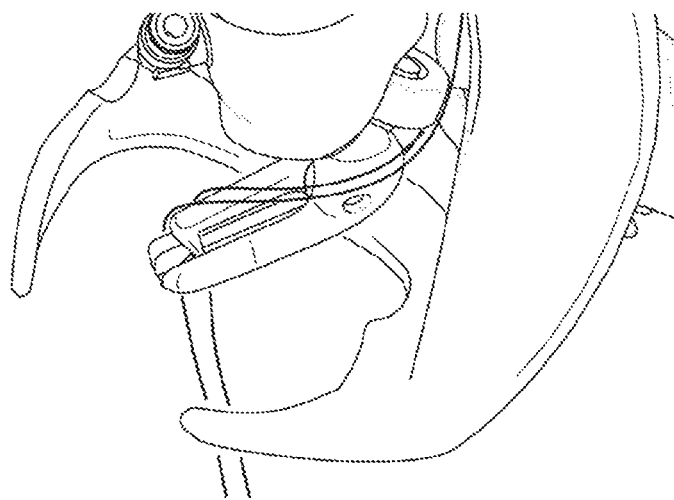

When the knot is dropped by the knotter 10, the strand 66b from source 74, as well as strand 64b from source 72 is still retained in the second notch 112 and possibly also in the first notch 111 of the twine disc 201. At this instance, the upper lip 101 is open again. Consequently, as the needle 11 continues to retract, the strand 66b is draped downwardly across the bale chamber 2 thereby pushing the upper lip 101 down because of the pressure of the strands on the upper lip 101, while the tucker arm 31 lowers to its normal position. Upon reaching the condition illustrated in FIG. 6I, the strands 64b and 66b are in position for initiating the second tying cycle. The swing arm 400, and in particular guidance part 406, assures that the strands 64b and 66b are properly positioned across and in engagement with the billhook 100, whereupon the latter and the twine disc 201 are operated by their second respective gear stretch 505 and gear section 606 on the knotter disc 501, see FIGS. 6J and 6K.

Thus, the second knot becomes formed, whereupon the arm 400 is once again actuated, but this time by the second cam shoulder 444. Preferably the twine disc 201 has a protruding ridge 213 positioned after the second notch 212, seen in a rotation direction of the disc 201, so that the twine holder 202 is moved away from the twine disc 201 when the disc is further rotated during the forming of the second knot. FIG. 4A illustrates a first example of a possible twine receiver 200 comprising a twine disc 201 and a twine holder 202. The twine disc 201 comprises a first disc 221 and a second disc 222 fixed on an axis 223. The twine holder comprises a first press plate 231 and a second press plate 232 intended for being inserted between the first and second disc 221, 222. The first press plate is intended for being in operative contact with the outer side of the first disc 221. The first disc 221 is provided at its inner and/or outer side with a protruding ridge 213. In the embodiment of FIG. 4A the ridge extends at both sides of the first disc 221, while in the embodiment of FIG. 4B the ridge extends only at the outer side of disc 221. In the variant of FIG. 4A, the first disc 221 is provided with an opening 224, and the ridge is formed by a piece 213 that is fixed through the opening 224 on the second disc 222. The skilled person will understand that other shapes are possible and that it may be possible to provide more or less notches in the twine disc. However, providing the twine disc with only two notches 211, 212 spaced along the circumference at an angle which approximately 90 degrees, as in the embodiment of FIG. 4A, is advantageous because this will allow the notches to be located at a lower part of the twine discs 201 when the knotter is in a non-active state. This will avoid that dirt can accumulate in the notches in the non-operative state of the knotter.

According to an alternative variant the pressure exerted by the leaf spring 220 could be regulated using a setting means adapted to decrease this pressure at the end of the second rotation of the billhook 100. According to yet another possibility the twine holder 202 could be pushed away against the force of the leaf spring 220 during the formation of the second knot. The skilled person understands that this regulating of the pressure/pushing away of the twine holder can be reached using any suitable mechanical or hydraulic transfer. Also, instead of providing the spring means 220, there could be provided a different actuator for biasing the twine holder 202. Finally the skilled person understands that an adaption of shape of the notches 211, 212 and the use of a protruding ridge 213 may be combined.

Figure 6K:
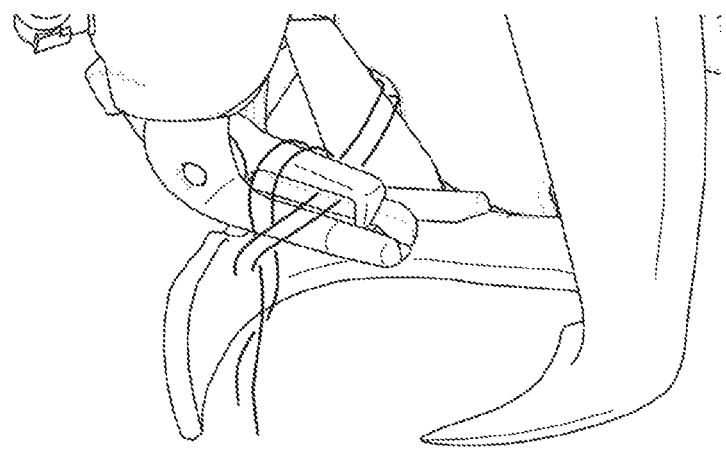
Figure 6L:
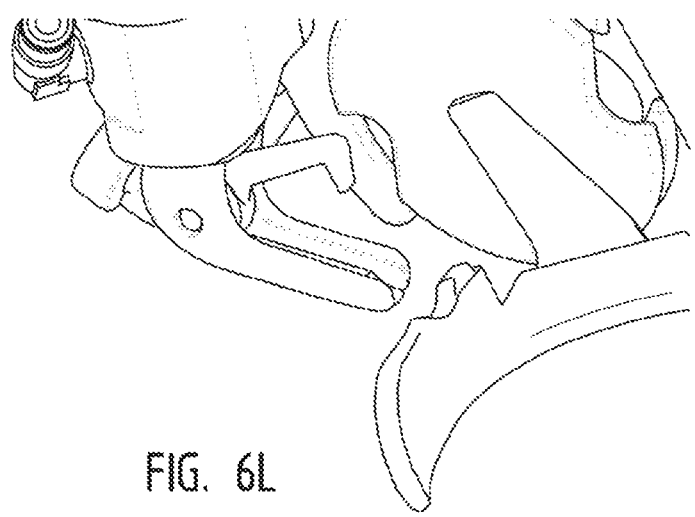

Because the free ends of the strands 64b and 66b are considerably longer than the free ends obtained during the first knot formation, upon finalizing the knot, free ends 64b and 66b no longer are pulled completely out of the knot, resulting in a so-called loop-knot 68b, as best seen in FIG. 6K and in FIG. 2. FIG. 6L illustrates the swing arm 400 with the lower end portion in the forward position, after removal of the knot.

As illustrated in FIG. 3A-3D, there is provided a supplementary gear section 606 providing a prolonged operation of the twine disc 201, so that the twine disc rotates over approximately 270 degrees during the second knotting cycle. This prolonged rotation in combination with the protruding ridge 213 will result in the strands 64b and 66b being no longer retained between the twine disc 201 and the twine holder 202, causing a further slipping of the twines during the forming of the second knot. Indeed, even though the knife blade 403 is very sharp, it will not be able to cut the strands because instead of holding the strands, the twine disc 201 is releasing them on account of the continued rotation of the twine disc 201 and the low pressure of the twine holder 202 on the twines, while the arm 400 continues moving and stripping of the almost completed knot from the billhook 100, thus pulling the strands out of the twine disc 201. The skilled person understands that the supplementary gear section 606 is not necessary, and that a similar effect can be reached when the tensioning force of the leaf spring 220 to the twine holder 202 is sufficiently decreased.

This second knot is the start of a new bight for the next bale. Such bight is in position to receive new material that is packed into the bale chamber by the plunger, and the bight grows in length as additional lengths of the strands 64b and 66b are simultaneously pulled from their sources 72 and 74. Finally, when the bale has reached its desired size, the sequence returns to its starting point, whereupon the bight is closed by operation of the needle 11 to complete the loop around the bale and form the other knot.

While the principles of the invention have been set out above in connection with specific embodiments, it is to be understood that this description is merely made by way of example and not as a limitation of the scope of protection, which is determined by the appended claims.

The invention claimed is:
1. Knotter system comprising:
   a billhook for forming a knot;
   a twine receiver for holding twines;
   a twine delivering system for delivering twines across the billhook to the twine receiver;
   a swing arm having a lower end portion; said swing arm being arranged for moving the lower end portion below the billhook, between a backward position and a forward position, said lower end portion being provided with a knife blade for cutting twines between the billhook and the twine receiver whilst moving from the backward position to the forward position;
   a first drive adapted to make the billhook perform at least a first full rotation and a second full rotation and to move the swing arm at least two times from the backward position to the forward position and back during a full operation cycle to form respectively a first and second consecutive knot;
   wherein the twine receiver comprises a rotatable twine disc and a twine holder, said twine holder being adapted to clamp twines against the twine disc;
   wherein said twine disc is provided with at least a first and a second notch for receiving the twines, said twine disc being provided with a protruding ridge located after the second notch, seen in a direction of rotation of the twine disc, such that the twine holder is pushed away by the protruding ridge at least one of during and after the formation of the second knot.

2. Knotter system of claim 1, further comprising a second drive adapted for rotating the twine disc from an initial position to a first position during a first turn whilst clamping twines in the first notch, for forming of the first knot, and for proceeding to rotate the twine disc from the first position to the initial position during a second turn whilst letting twines in the second notch slip during the forming of the second knot.

3. Knotter system of claim 1, wherein said first and second notch are spaced apart along the circumference of the twine disc, at a first angle below 180 degrees.

4. Knotter system of claim 2, wherein the first turn is a rotation over the first angle, and the second turn is a rotation over 360 degrees minus the first angle.

5. Knotter system of claim 1, wherein the twine disc comprises a first disc and a second disc fixed to a rotatable axis, and the twine holder comprises a first press plate intended for being in operative contact with an outer side of the first disc and a second press plate intended for being inserted between inner sides of the first and second disc.

6. Knotter system of claim 5, wherein the first disc is provided at at least one of its inner and outer side with the protruding ridge protruding in radial direction from the axis.

7. Knotter system of claim 5, wherein said first disc is provided with an opening, and wherein said protruding ridge is formed by a part mounted in the opening and fixed to the second disc.

8. Knotter system of claim 5, wherein said first disc and said second disc are mounted parallel to each other and have substantially the same shape and dimensions, wherein said first and second notches are formed by recesses at the circumference of the first and second discs.

9. Knotter system of claim 1 in combination with a baler, wherein the knotter system is mounted to the baler.

10. Method for making two consecutive knots, comprising:
  guiding twines to be knotted over a billhook and clamping said twines at a clamping location;
  making the billhook perform a first full rotation to form a first knot and moving a swing arm with a knife blade from a backward position to a forward position to remove the first knot from the billhook and to cut the twines between the first knot and the clamping location;
  moving the swing arm back to the backward position, guiding the twines over the billhook, and making the billhook perform a second full rotation to form a second knot;
  wherein during the forming of the second knot, the twines are clamped against a twine disc by a twine holder, and wherein at least one of during and after the formation of the second knot the twine holder is pushed away by a protruding part on the twine disc releasing the twines;
  moving the swing arm from the backward position to the forward position following the formation of the second knot, wherein, due to the pushing away of the twine holder, the twines slide over the knife blade without cutting the twines; and moving the swing arm back to the backward position.

11. Method of claim 10, wherein, before forming the first knot the twines are delivered across the billhook in a first notch of the twine disc; said twines being held in said first notch by the twine holder during the forming of the first knot; and
  wherein said twine disc is rotated so that the twines are received in a second notch of the twine disc before cutting following the forming of the first knot; said twines being held in said second notch by the twine holder during the forming of the second knot.

12. Method of claim 11, wherein the twine disc is rotated from an initial position to a first position during a first turn whilst clamping twines in the first notch, for forming of the first knot, and from the first position to the initial position during a second turn whilst letting twines in the second notch slip during the forming of the second knot.

13. Method of claim 12, wherein the first turn is a rotation over a first angle below 180 degrees, and the second turn is a rotation over 360 degrees minus said first angle.

14. Method of claim 13, wherein the first turn is a rotation over approximately 90 degrees and the second turn is a rotation over approximately 270 degrees.

15. Method of claim 10, wherein the swing arm is maintained in the forward position after the second rotation of the billhook for a predetermined period which is sufficient to allow removal of the second knot from the billhook.

* * * * *